(12) United States Patent
Imura

(10) Patent No.: US 7,286,852 B2
(45) Date of Patent: Oct. 23, 2007

(54) SUBSCRIBER IDENTITY MODULE AND METHOD OF PREVENTING ACCESS THERETO, AND MOBILE COMMUNICATION TERMINAL DEVICE

(75) Inventor: Shigeru Imura, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 307 days.

(21) Appl. No.: 10/986,775

(22) Filed: Nov. 15, 2004

(65) Prior Publication Data

US 2005/0143059 A1    Jun. 30, 2005

(30) Foreign Application Priority Data

Dec. 1, 2003    (JP)    ............................. 2003-401289

(51) Int. Cl.
*H04B 1/38*    (2006.01)

(52) U.S. Cl. ...................... 455/558; 455/407; 455/557; 379/433.09

(58) Field of Classification Search ................ 455/558, 455/407, 557; 379/433.09

See application file for complete search history.

(56) References Cited

U.S. PATENT DOCUMENTS 5,887,266 A * 3/1999 Heinonen et al. ........... 455/558
5,898,783 A   4/1999 Rohrbach
2001/0016895 A1 8/2001 Sakajiri et al.

FOREIGN PATENT DOCUMENTS

DE    101 27 123 A1    12/2002
GB    2 380 356 A    4/2003

* cited by examiner

*Primary Examiner*—Lester G. Kincaid
*Assistant Examiner*—Sayed T. Zewari
(74) *Attorney, Agent, or Firm*—Oblon, Spivak, McClelland, Maier & Neustadt, P.C.

(57) ABSTRACT

A subscriber identity module (SIM) for subscriber identification configured so as to be detachably loaded on a mobile communication terminal device has a application section for storing an externally downloaded application program, a processing section (or a SAT function section) for executing this application program, a storage section for storing file administrative description, file description, and file data, and file administration section for administering these information and data. The processing section, after the downloading of the application program, executes the downloaded application program to control the file administration section. Consequently, access to the data stored in the subscriber identity module is prevented, thereby preventing the third party to access the data stored in the subscriber identity module of the lost or stolen mobile communication terminal.

14 Claims, 11 Drawing Sheets

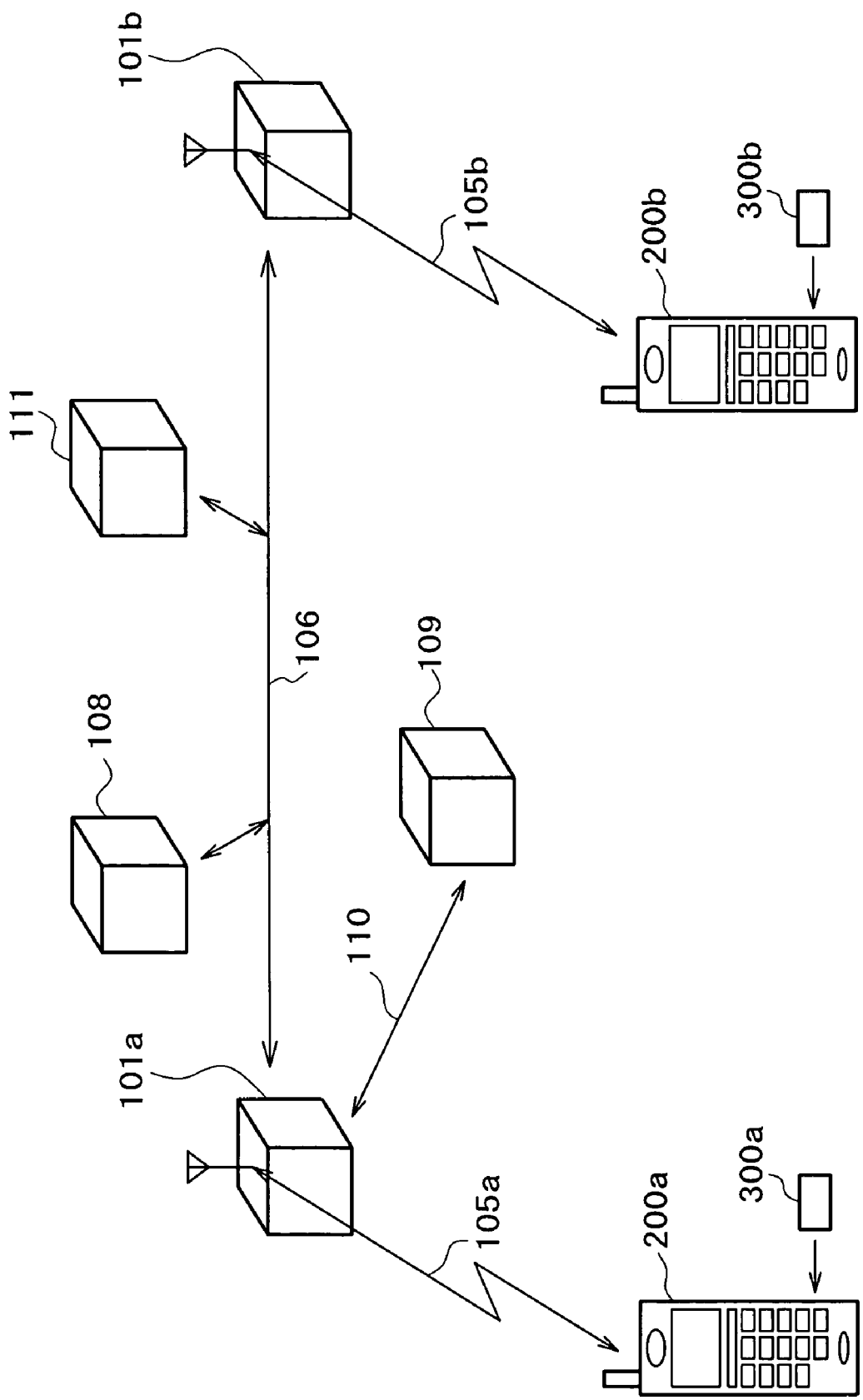

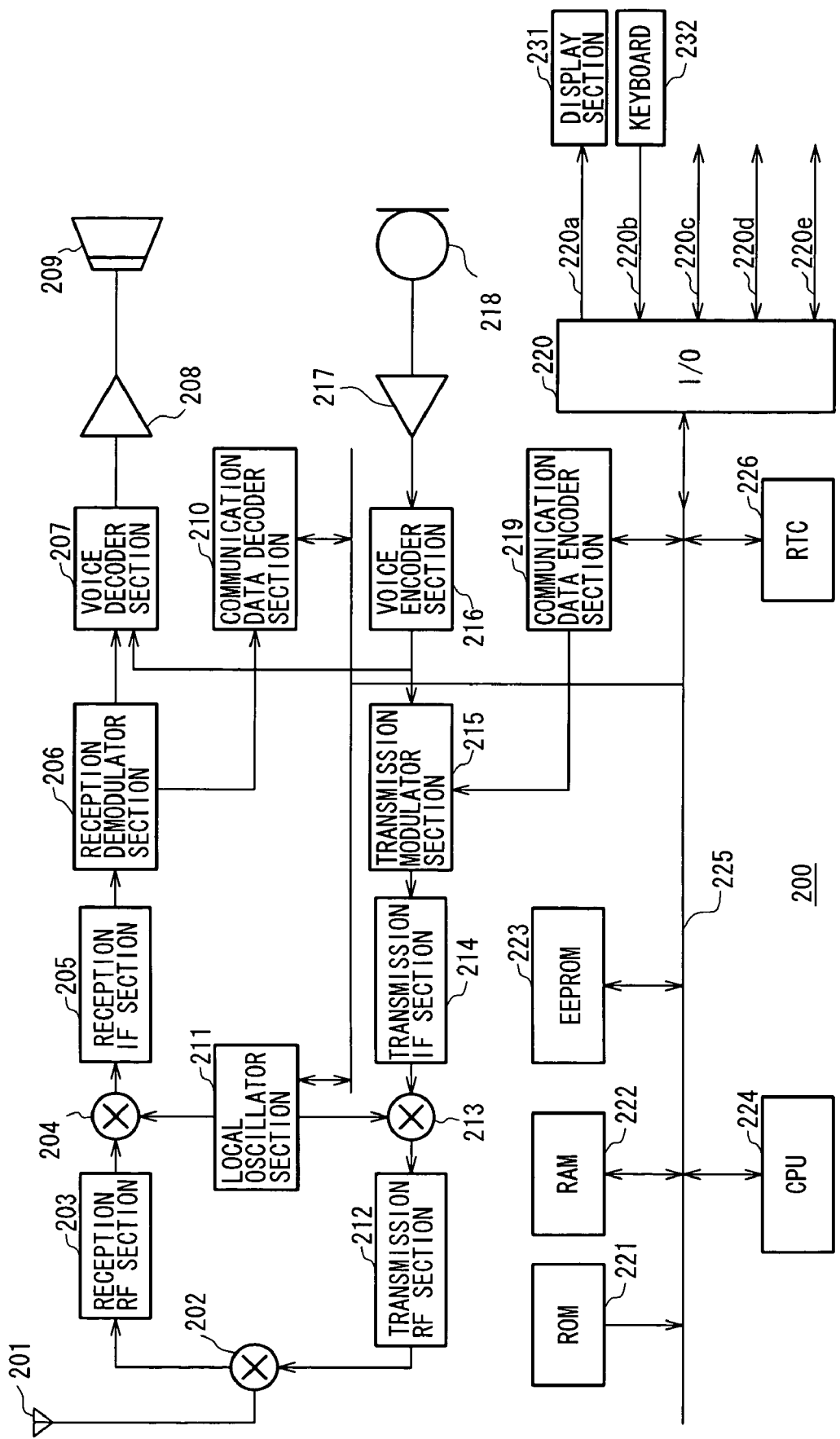

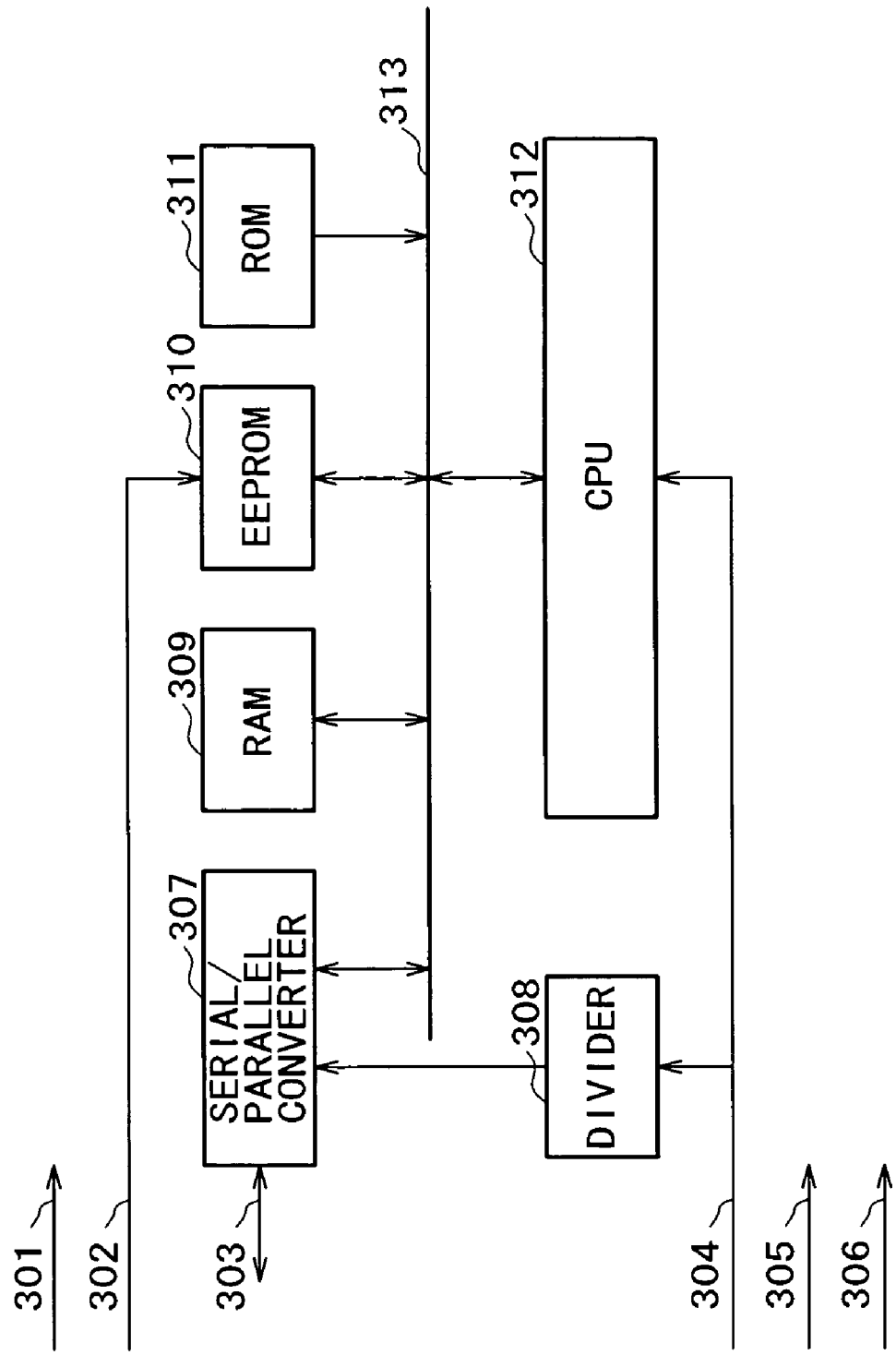

| BYTE(S) | DESCRIPTION | LENGTH | |
|---|---|---|---|
| 1-2 | RFU | 2 | 403 |
| 3-4 | TOTAL MEMORY OF THE SELECTED DIRECTORY | 2 | 404 |
| 5-6 | DIRECTORY ID | 2 | 405 |
| 7 | DIRECTORY TYPE | 1 | 406 |
| 8-12 | RFU | 5 | 407 |
| 13 | LENGTH OF FILE DATA FOR FOLLOWING APPLICATION | 1 | 408 |

402

| BYTE(S) | DESCRIPTION | LENGTH | |
|---|---|---|---|
| 14 | DIRECTORY CHARACTERISTICS | 1 | 409 |
| 15 | SUB-DIRECTORY COUNT | 1 | 410 |
| 16 | FILE COUNT BELOW CURRENT DIRECTORY | 1 | 411 |
| 17 | PIN, UNBLOCKING PIN, ADMINISTRATIVE CODE COUNT | 1 | 412 |
| 18 | RFU | 1 | 413 |
| 19 | PIN 1 STATUS | 1 | 414 |
| 20 | UNBLOCKING PIN 1 STATUS | 1 | 415 |
| 21 | PIN 2 STATUS | 1 | 416 |
| 22 | UNBLOCKING PIN 2 STATUS | 1 | 417 |
| 23 | ADMINISTRATIVE MANAGEMENT USE | 1 | 418 |

RFU: RESERVED FOR FUTURE USE

DIRECTORY TYPE CODING (EXAMPLE) 406
00: RFU
01: DIRECTORY
02: SUB-DIRECTORY
04: DATA FILE

DIRECTORY CHARACTERISTICS (EXAMPLE) 409
BIT 1: CLOCK STOP MODE
BIT 2: RFU
BIT 3-4: CLOCK STOP MODE
BIT 5-7: RFU
BIT 8: VALID/INVALID

SECURITY STATUS (EXAMPLE) 414-417
BIT 1-4: PIN FALSE INPUT COUNTER
  0 INDICATIVE OF BLOCKED
BIT 5-7: RFU
BIT 8: INITIALIZED INFORMATION

FIG. 5

| BYTE(S) | DESCRIPTION | LENGTH | |
|---|---|---|---|
| 1-2 | RFU | 2 | 502 |
| 3-4 | FILE SIZE | 2 | 503 |
| 5-6 | FILE ID | 2 | 504 |
| 7 | TYPE OF FILE | 1 | 505 |
| 8 | FOR CYCLIC FILE USE | 1 | 506 |
| 9-11 | ACCESS CONDITIONS | 3 | 507 |
| 12 | FILE STATUS | 1 | 508 |
| 13 | LENGTH OF FOLLOWING DATA (BYTE 14 TO THE END) | 1 | 509 |
| 14 | STRUCTURE OF FILE | 1 | 510 |
| 15 | LENGTH OF RECORD | 1 | 511 |

RFU: RESERVED FOR FUTURE USE

FILE TYPE CODING(EXAMPLE) 505
00: RFU
01: DIRECTORY
02: SUB-DIRECTORY
04: DATA FILE

MODE(EXAMPLE) 506
INCREASE COMMAND
ENABLE/DISABLE FOR CYCLIC FILE

BYTE 9 (EXAMPLE) 507A
BIT 1-4: UPDATE
BIT 5-8: READ; SEEK

BYTE 10 (EXAMPLE) 507B
BIT 1-4: RFU
BIT 5-8: INCREASE

BYTE 11 (EXAMPLE) 507C
BIT 1-4: INVALIDATE
BIT 5-8: REHABILITATE

ACCESS CONDITION
CODE (EXAMPLE) 512
0: ALW(AYS)
1: PIN1
2: PIN2
3: RFU
4: ADM(INISTRATIVE)
:
E: ADM
F: NEV(ER)

BYTE STATUS (EXAMPLE) 508
BIT 1: INVALIDATED OR NOT
BIT 2-8: RFU

FILE STRUCTURE (EXAMPLE) 510
00: TRANSPARENT
01: LINEAR FIXED
03: CYCLIC

MCC: MOBILE COUNTRY CODE
MNC: MOBILE NETWORK CODE
MSIN: MOBILE SUBSCRIBER IDENTIFICATION NUMBER
NMSI: CONSISTS OF THE MNC AND MSIN

| IMSI | TELEPHONE NUMBER | FAX NUMBER | DATA NUMBER |
|---|---|---|---|
| 262 01 0123456789 | 0170 850 xxxx | 0170 850 xxxy | 0170 850 xxxz |
| 804 | 805 | 806 | 807 |

| NEW IMSI | TELEPHONE NUMBER | FAX NUMBER | DATA NUMBER |
|---|---|---|---|
| 262 01 987654321 | 0170 850 xxxx | 0170 850 xxxy | 0170 850 xxxz |
| 808 | 805 | 806 | 807 |

SUBSCRIBER IDENTITY MODULE AND METHOD OF PREVENTING ACCESS THERETO, AND MOBILE COMMUNICATION TERMINAL DEVICE

BACKGROUND OF THE INVENTION

The present invention relates generally to a subscriber identity module detachably loaded on the main body of a mobile communication terminal device for identifying subscribers and, more particularly, to a method of preventing access to this subscriber identity module for data at the time of its loss by mistake or theft.

In the pan-European Digital Cellular System (hereafter referred to as GSM (Global System for Mobile communications), the subscriber identity module (SIM) is used in each GSM-compliant mobile communication terminal device (hereafter simply referred to as a mobile terminal or a terminal) to enhance security. SIM, having data processing and storage capabilities, is a card-shaped device that is detachably loaded in the terminal device for GSM subscriber identification. When the user loads SIM into a terminal device and enters PIN (Personal Identification Number), the communication and other capabilities of the mobile terminal become effective. However, the user sometimes feels bothersome when prompted to enter PIN every time the terminal device is powered on, thereby making the user to use the mobile phone with the PIN authentication function disabled. If the mobile phone with the PIN authentication function disabled is lost by mistake or theft, the party in possession of the lost mobile terminal can communicate by using it in complete disregard of user's intention.

To prevent such problem from happening, an authentication center (AuC) is set up in the GSM system. The authentication center has a subscriber list that contains the correlations between user IMSI (International Mobile station Subscriber Identity) and user phone number. If the user whose mobile terminal has been lost reports thereof, the correlation in the subscriber list is changed to reject the calls originated by the lost mobile terminal. Namely, the user notifies the authentication center with which his IMSI is registered of the loss of user's mobile terminal to have a new IMSI issued, thereby preventing the mobile terminal having the lost IMSI from establishing communication by a third person through the appropriate processing by the base station.

However, SIM stores personal data, such as AND (Abbreviated Dial Number) and FDN (Fixed Dial Number), for example. With the PIN authentication function disabled on the lost SIM, the personal data is ready for reading from the SIM on any mobile terminal.

This problem also exists with UIM (or USIM) that is adopted on the third-generation mobile phone system.

SUMMARY OF THE INVENTION

It is an object of the present invention to provide a subscriber identify module and a method of, if a mobile terminal with the PIN authentication function turned off is lost by mistake or theft, preventing access to the subscriber identity module loaded in the lost mobile terminal to read data therefrom.

In carrying out the invention and according to one aspect thereof, there is provided a subscriber identity module configured so as to be detachably loaded on a mobile communication terminal for the purpose of subscriber identification, including: application storage means for storing an application program downloaded from the outside; processing means for executing the application program; storage means for storing file administrative description, file description, and data; and file administration means for administering the file administrative description, the file description, and the data; wherein the processing means, after downloading of the application program, executes the application program to control the file administration means, thereby preventing access to the data.

In the above-mentioned subscriber identity module, the file administrative description includes information indicative whether a password function is enabled and information indicative whether a password continuous false input count in a password function enabled status and access to the data is prevented by changing the file administrative description such that the password function is enabled and the password continuous false input count is set to a predetermined maximum count.

In the above-mentioned subscriber identity module, the file administrative description includes information indicative of a password continuous false input count for restoring a password function disabled status to a password function enabled status and access to the data is prevented by changing the file administrative description such that the password continuous false input count is set to a predetermined maximum count.

In the above-mentioned subscriber identity module, access to the data is prevented by deleting data that is under protection.

In the above-mentioned subscriber identity module, the file description includes a data size and access to the data is prevented by changing the data size that is under protection to 0.

In the above-mentioned subscriber identity module, access to the data is prevented by deleting subscriber number information stored in the subscriber identity module.

In the above-mentioned subscriber identity module, the file description includes a file access condition and access to the data is prevented by setting the file access condition for the data under protection to an access disabled status.

In the above-mentioned subscriber identity module, the application program for protecting the data stored in the subscriber identity module is externally downloaded in a postmortem manner; however, it is also practicable to store the application program in the storage means in advance to prevent access to the data in accordance with an externally entered command.

In carrying out the invention and according to another aspect thereof, there is provided a data access preventing method including the steps of: comparing, at a base station, subscriber number information received with a location registration information request received from a mobile communication terminal device with subscriber number information of a subscriber identity module for data protection; and automatically executing, if a match is found in the comparison, a predetermined application program by sending the predetermined application program to the mobile communication terminal device and downloading the application program into the subscriber identity module without considering intention of a user of the mobile communication terminal device, thereby preventing access to data stored in the subscriber identity module.

For the prevention of the access to the above-mentioned data, various specific methods may be employed.

If the application program for protecting data stored in the subscriber identity module is stored in the storage means in advance, the base station can send a command for data protection to the mobile communication terminal device instead of sending the application program, thereby automatically executing the application program stored in the subscriber identity module without considering the intention of the user of the mobile communication terminal device.

The mobile communication terminal device according to the invention is configured such that the subscriber identity module for subscriber identification is detachably loaded, including: an application section for storing an externally downloaded application program, a SAT function section for executing this application section, a non-volatile storage section for storing file administrative description, file description, and file data, and a file administration section for administering these information and data. The SAT function section executes the downloaded application to control the file administration section, thereby preventing the access to the data stored in the subscriber identity module.

In the above-mentioned mobile communication terminal device, the application program for protecting data stored in the subscriber identity module is downloaded from the outside in a postmortem manner; however, it is also practicable to store the application program in the storage means in advance to prevent the access to the data in accordance with an externally entered command.

As described above and according to the invention, if a mobile communication terminal is lost or stolen with the PIN authentication function disabled, the third party in possession of the lost or stolen mobile communication terminal is prevented from accessing the data stored in the subscriber identity module of this device.

In addition, the embodiment of the invention can be realized by use of the existing functions of the mobile communication terminal, so that no new hardware need be added and therefore no increase in cost is involved.

BRIEF DESCRIPTION OF THE DRAWINGS

FIG. 1 is a schematic diagram illustrating a configuration of a digital cellular system practiced as one embodiment of the invention;

FIG. 2 is a block diagram illustrating a configuration of a general mobile phone in the digital cellular system shown in FIG. 1;

FIG. 3 is a block diagram illustrating an exemplary internal configuration of SIM;

FIG. 4 is a diagram illustrating exemplary directory description for file administration in SIM;

FIG. 5 is a diagram illustrating exemplary file information describing information for directly managing access and so on of a data file in SIM;

DETAILED DESCRIPTION OF THE PREFERRED EMBODIMENT

Figure 6:
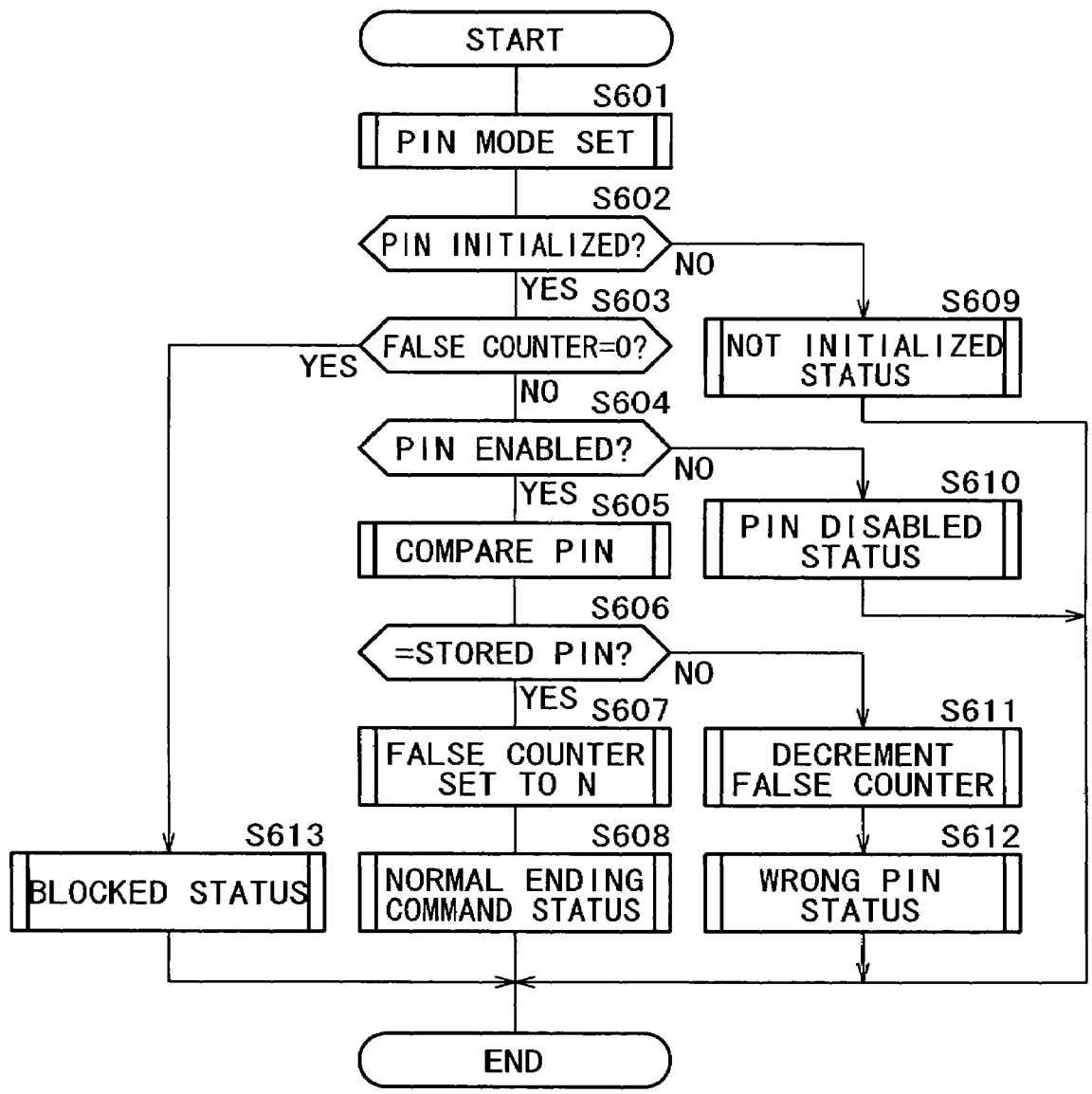
FIG. 6 is a PIN access flowchart as normal exemplary password processing associated with security.

The following describes in detail a preferred embodiment of the invention with reference to drawings appended hereto.

First, a configuration of a digital cellular system practiced as one embodiment of the invention will be described with reference to FIG. 1. Referring to FIG. 1, there is shown a conceptual diagram of this system, in which a general concept of mobile terminals and a network is depicted. For example, when making a call from a mobile phone 200a, which is a mobile terminal, to mobile phone 200b, which is another mobile terminal, the user of the mobile phone 200a enters the phone number of the mobile phone 200b and dials. This dial callout may also be executed automatically by software installed in the mobile phone 200a. Then, the mobile phone 200a connects to a mobile phone base station 101a through a wireless interface (or air interface) 105a. The mobile phone base station 101a is connected to another mobile phone base station 101b via a digital interface 106 (normally an IDSN, for example). Because the mobile phone 200b is positionally registered with this mobile phone base station 101b via an air interface 107b, the mobile phone 200a is eventually connected to the mobile phone 200b, thereby establishing a dialing connection. On the other hand, the connection between a wired telephone and the mobile phone 200a or the mobile phone 200b is established by connecting the wired telephone to a PSTN (Public Switched Telephone Network) station 108 to which the digital interface 106 connecting to the mobile phone base station 101a or the mobile phone base station 101b is connected.

It should be noted that the mobile phone 200a and the mobile phone 200b are generically referred to herein as a mobile phone 200 (this holds true also with other reference numerals).

An Internet service provider 109 is connected to the mobile phone base station 101a via a digital interface 110, it is possible to enjoy services from the mobile phone 200a via the mobile phone base station 101a in accordance with a contract concluded between the mobile phone 200a and the service provider 109. These services include the downloading of updated data and the provision of other data, for example. In addition, a service may be provided in which an application using SAT (SIM Application Toolkit) is sent to the user through SMS-PP (Short Message Service Point-to-Point) or SMS-CB (Short Message Service Cell Broadcast) for example and the information selected by the user as a result of the execution of the application can be received.

SAT is a function of enabling telecommunication carriers to add their unique applications into the SIM. The present invention is intended to change the data stored in the SIM by use of this function to prevent the unauthorized leakage of personal data from the SIM. A subscriber authentication center AuC 111 registers the subscriber number IMSI of each subscriber in advance. When the user turns on the power to the mobile phone 200a for example, the IMSI stored in the SIM is sent to the subscriber authentication center AuC 111 via the air interface 105a, the mobile phone base station 101a, and the digital interface 106. On the basis of the received IMSI, the subscriber list is referenced in the subscriber authentication center AuC 111. If the user is found to be an authorized user, then such a procedure necessary for communication establishment as location is executed. IMSI is not directly associated with telephone number, facsimile number, or data number, but is only associated with these numbers in the subscriber authentication center AuC 111. The details of IMSI will be described later.

The following describes a configuration of a general mobile phone by use of the block diagram shown in FIG. 2, for example. A reception signal entered at an antenna 201 is led to a reception RF section 203 via a selector 202. In the reception RF section 203, band limitation and automatic gain control are executed on the signal so as to set it to a proper level. Next, in order to convert a desired reception frequency to a constant frequency, the processed signal is sent to a mixer 204 to be mixed with a frequency-controlled signal supplied from a local oscillator 211. The output from the mixer 204 is then sent to a reception IF section 205 to be A/D-converted to provide IQ digital data that has a constant bit rate. A reception demodulator section 206 executes removal of influence such as fading, type discrimination, de-interleave, and error correction on this IQ digital data, which is consequently divided into voice data and communication data. Because the voice data is normally compressed and is supplied in blocks of received bursts, the voice data is decompressed and decoded by a voice decoder section 207 to be D/A-converted in accordance with voice sampling rate. Then, the resultant D/A-converted signal is power-amplified by a speaker amplifier 208 and the amplified signal is sound from a speaker 209. On the other hand, the communication data, which was separated from the voice data in the reception demodulator section 206, is sent to a communication data decoder section 210 to be returned to its final original data. The original data is then sent to an I/O 220 via a CPU bus 225 and then to an external device via a data I/F 220*c*.

On the transmission side, voice is converted by a microphone 218 into an analog voice signal. Because the output of the microphone 218 is small, it is amplified by the microphone amplifier 217 to a necessary voltage. The amplified voice signal is then sent to a voice encoder section 216 to be A/D-converted at an appropriate sampling rate into a digital signal. The digital signal is encoded for compression into blocks suitable for the burst signal in RF. On the other hand, the digital data entered from the data I/F 220*c* of the I/O 220 is put into appropriate blocks by a communication data encoder section 219. The data from the voice encoder section 216 and the data from the communication data encoder section 219 are combined by a transmission modulator section 215 to provide IQ digital data that has a constant data rate. This IQ signal is D/A-converted by a transmission IF section 214 into an analog modulated signal and the converted signal is sent to a mixer 213, in which this signal is mixed with a conversion signal from the local oscillator 211 to get a desired transmission frequency. The signal having the desired transmission frequency is power-amplified by a transmission RF section 212 to a necessary transmission power. The resultant signal is then sent to the selector 202 to the antenna 201 to be radiated outside.

A ROM (Read Only Memory) 221 stores programs that are executed by a CPU (Central Processing Unit) 224 and display font data, for example. A RAM (Random Access Memory) 222 stores data obtained during the processing of a program by the CPU 224 and is used a work area through which data is moved to/from the reception section or the transmission section. An EEPROM (Electrically Erasable and Programmable ROM) 223 stores the settings of the mobile phone immediately before it is powered off and retains these settings thereafter. The stored settings are used again when the mobile phone is powered on, thereby providing user convenience. A realtime clock (RTC) 226 for clocking provides data time stamping, mobile phone time display, and alarm for example in providing date and time data. The I/O 220, the input/output interface with the external devices, is connected in this example to a display section 231 via an I/F 220*a* and to a keyboard 232 via an I/F 220*b*. The I/O 220 is further connected to the external devices via the data I/F 220*c*. An external storage I/F 220*d* is used to store data supplied from a memory stick or data downloaded from the service provider 109 shown in FIG. 1. A SIM I/F 220*e* provides interface with the SIM to be described later.

Referring to FIG. 3, there is shown an exemplary SIM internal configuration, in which a block diagram of a very general CPU-incorporating IC card. An operating power supply VCC 301 from the outside provides a voltage of 5V, 3V, or 1.8V. A program power supply VPP 302 is a program supply for an EEPROM 310, which is electrically erasable ROM, and providing generally the same voltage as the VCC 301 or generating the voltage inside the SIM. In this example, this voltage is supplied from the outside. However, this configuration is not essential to the present invention. A bidirectional data signal line I/O 303 is a signal line used to execute actual data input/output. When a data signal is not being inputted or outputted, this line is kept at generally the same voltage as the operating power VCC 301, thereby keeping the external control device and the SIM in a mutually data receiving state. A clock (CLK) 304 supplies a clock signal for driving a CPU 312 incorporated in the SIM and is appropriately divided to provide a transfer clock for determining the transfer rate of data which is exchanged in the bidirectional data signal line I/O 303. A reset (RST) 305 is a reset signal input that initializes not only the incorporated CPU 312 but also a divider 308, a serial/parallel converter 307, and so on. The serial/parallel converter 307 converts data serially transferred from the external device into parallel 8-bit data, for example. For this conversion, the bidirectional data signal line I/O 303 detects a start bit "L", followed by bit data in the positive logic of LSB first (or the negative logic of MSB first, selection of which is made by IC card manufacturer), attached with even-parity one bit. If a parity error is detected, the receiving side transmits "L" in a particular period in two clocks following the parity bit, in response to which the transmitting side transmits the same data again. This method is defined in ISO 7816 half-duplex asynchronous communication protocol. Through these processes, the serial data is converted into parallel equivalent. The RAM 309 temporarily stores the data that is required for the CPU 312 to execute processing or temporarily stores data until certain pieces of data are accumulated. The EEPROM 310 stores data that is used only internally or data that is used continuously while being updated. For example, in the digital cellular mobile terminal, the EEPROM 310 stores abbreviated dial data, contract contents, short messages, or control data for starting and maintaining communication. The EEPROM may also be the flash memory, which is an electronically rewritable non-volatile memory. A ROM 311 mainly stores programs to be executed by the CPU 312. Processing commands are entered from the external device via the bidirectional data signal line I/O 303. Each processing command is based on a public command system necessary for manufacturing and using mobile terminals, a non-public management command system for handling data that can be used only for security, such as a scramble key generator, issuer, or administrator, and a password. This further enhances security functions for SIM. The divider 308 obtains a clock for data transmission by use of a predetermined transmission rate by the bidirectional data signal line I/O 303 from the clock (CLK) 304 that drives the CPU 312.

A dividing ratio of 1/372, but not exclusively, is used in GSM. The CPU 312 executes the processing internal to the SIM in accordance with externally supplied commands. This processing is executed by determining an access condition unique to each internally stored data group (or data file), namely determining whether or not the verification of password is necessary or whether or not access right is given. A data bus (or a CPU bus) 313 is a signal line that, when the CPU 312 executes commands, reads commands from the ROM 311, temporarily stores data in the RAM 309, and moves access data for the EEPROM 310 to the external device.

The SAT-associated information is stored in the ROM 311 that cannot be read by the general user. An application received as SMS is first stored in an appropriate file in the electrically erasable EEPROM 310 and then executed. At this moment, a terminal profile is read from the terminal device. The profile data is stored in the RAM 309, which is a write/read memory, for example. Originally, the execution of SAT is done interactively with the user. However, since the present embodiment is intended to prevent the lost or stolen SIM from being used by any third party, SAT is executed without notifying the user thereof. Alternatively, a message indicative that the SIM concerned is a lost or stolen SIM is shown after the internal processing, thereby notifying that the SIM concerned cannot be used.

The following describes a SIM structure of GSM with reference to a logical file that is developed in memory. FIG. 4 shows an example of directory description that provides information for file administration in the SIM. This directory description 400 provides information about a main directory or a sub directory below the main directory. The same holds with the information for sub directory. The directory description 400 includes main directory or sub directory memory capacity, number of files, and information indicative whether security password capability is provided or SIM clock stop is enabled. Except for a hidden directory for management, this information can be read from the external device. Coded contents are largely classified into two types. One is common description 401, which is coded in a common format independently of applications. Bytes 1 and 2 (403) are reserved for future use. Following bytes 3 and 4 are indicative of remaining effective memory capacity 404 of the SIM. Bytes 5 and 6 form directory ID 405 that is used to identify that directory by a 2-byte code. Byte 7 is directory type 406 for coding the data for identifying a directory or a file type to be described later. For example, the main directory is coded into 01Hex (Hex denoting hexadecimal notation), the sub directory below the main directory is coded into 02Hex, and coding into 04Hex is indicative of a data file. Bytes 8 through 12 (407) are reserved for future use. Byte 13 is file data length 408 for the following application. This is the size of specification 402 for each application and used to indicate the length of directory information. This allows the sub directory information and data file to be allocated continuously thereafter, thereby providing the effective use of memory.

The following describes the contents of the specification 402 for each application. Byte 14 is directory characteristics 409 indicative of whether or not the CPU operating clock supplied to the SIM can be stopped. If this clock can be stopped, in which state "H", or "L" the stop is made is specified. The power consumption may change depend on the stop state, so that mobile terminals or the like are designed to minimize the power consumption also by means of the directory characteristics. The MSB of the directory characteristics 409 is indicative of whether PIN1 is valid or invalid. PIN1 is set a password mainly for checking the authentication of the user, which can easily check this state. Byte 15 is sub directory count 410 indicative of the number of sub directories below the selected main directory. Byte 16 is file count 411 below current directory indicative of the number of files below the main directory and sub directories. Byte 17 is PIN, PUK (Password Unblocking Key=Unblocking PIN), administrative code count 412 indicative of the number of passwords, unblocking numbers if the password function is blocked, and special administrative codes. For example, if two types of PINs and two types of administrative codes not open to the public are set, then byte 17 is coded into 4Hex. Byte 23 (418) is provided for use by the administrator of the SIM. Byte 19 is PIN1 status 414 of which coding example is shown in a security status table of the directory information shown in FIG. 4. For example, if PIN1 is set, bit 8 is coded into 1 and if a false counter is set to 3, code 83Hex is provided. In this case, if PIN1 password fails successively, the false counter is set to 0, thereby blocking the user from accessing the SIM that requires PIN1 verification any further. This state is referred to that PIN1 is in the blocked state. If PIN1 verification has been successfully done, the false counter is reset to initial value 3. These operations take place also on byte 21, PIN2 status 416. Byte 20 is PUK1 status 415 of which coding example is shown in the security status table of the directory information shown in FIG. 4. For example, if PIN1 is set, bit 8 of this PUK1 status 415 that is in a pair with PIN1 is coded into 1. If PIN1 is blocked with the false counter of the PIN1 status 414 being 0, password number PUK1 is specially prepared to unlock this status and the PUK1 status 415 is indicative of this status. The same holds with PIN2. This PUK1 status 415 is also coded into 8Ahex if the false counter is set to 10, for example. In this case, if this password PUK1 fails 10 times consecutively, the PUK1 false counter is set to 0, thereby blocking the user from doing password PUK1 verification for unblocking PIN1 any further. In this status is entered, there is no way other than restoring the status by use of the administrative command system that is used only by the issuer or administrator. This configuration also contributes to the enhancement of security. If the verification of password PUK1 for unblocking PIN1 block has been done successfully, the value of the PUK1 false counter is reset to initial value 10, upon which the user newly set PIN1. These operations are also executed with byte 22, PUK2 status 417. The present embodiment also includes means for forcibly change the PIN1, PIN2, PUK1, and PUK2 false counters to the blocked status.

The following describes file description that describes the information for directly managing data file access operations for example, by use of file information 500 illustrated in FIG. 5. Bytes 1 and 2 (502) are reserved for future use. Bytes 3 and 4 are indicative of file size 503 of data part. In the present embodiment, this data size is set to 0, thereby making the SAT forcibly execute and realize no data status. Bytes 5 and 6 form file ID 504 that are used for file identification by a 2-byte code. Byte 7 is file type 505 that is coded into 04Hex indicative of a data file. Byte 8 (506) is data dedicated to a cyclic file. This indicates whether or not an increase command usable only with this cyclic file is executable. For example, the cyclic file is a file having a file structure that can increment the unit of fee-charging information or the like by a single command at certain time intervals. This data indicates whether this command is executable or not. This data can be used for administrative use that, if the fee-charging information has been counted up to a maximum level, this SIM cannot be used any more, for example. Bytes 9 through 11 form access condition 507 that sets a security condition that must have been satisfied when executing exemplary commands 507a through 507c corresponding to the bytes. If access condition code 512 is 0Hex, it indicates that access is always enabled. If it is 1Hex, it indicates that access is enabled when the verification of PIN1 has successfully ended. If it is 2Hex, it indicates that the verification of PIN2 has successfully ended. 3Hex is reserved for future use. 4Hex through EHex indicate that access is enabled if the nonpublic administrative access condition is satisfied. FHex indicates that access is disabled. For example, if byte 9 (507a) is coded into 01Hex, "UPDATE" can be used if the verification of PIN1 has successfully ended and "READ" or "SEEK" can be used unconditionally. In the present embodiment, this access condition is realized by forcibly setting all files to FHex by use of SAT. Byte 12, file status 508, indicates the status of this file. For example, bit 1 indicates whether this file can be used or not. The following byte 13, subsequent file information data length 509, is used to indicate the location of file information 500 in the data size of each application. A data file is allocated thereafter continuously for the effective use of memory. Byte 14, structure of file 510, indicates a file logical structure. If byte 14 is coded into 00Hex, certain volume of data is stored without change as with ordinary memory. If this byte is coded into 01Hex, certain format data is stored as a group. For example, if one abbreviated dial is 50 bytes long, this may be handled as a record, thereby allocating a memory area of 5 KB equivalent to 100 abbreviated dials=500 records. If this byte is coded into 03Hex, the same record format as "Linear Fixed" of 02Hex is provided, in which the sequence of records can be sequentially changed. For example, the priority of a particular record can be changed to move this record to the first record position. If a sequence of records starts with the first record and ends with the n-th record, this sequence can be changed such that the first record is moved to the n-th record and the second record is moved to the first record, for example. Byte 15, length or record 511, indicates a memory size of one record. From file size 503 and this length of record 511, the number of usable records can be computed.

Figure 11:
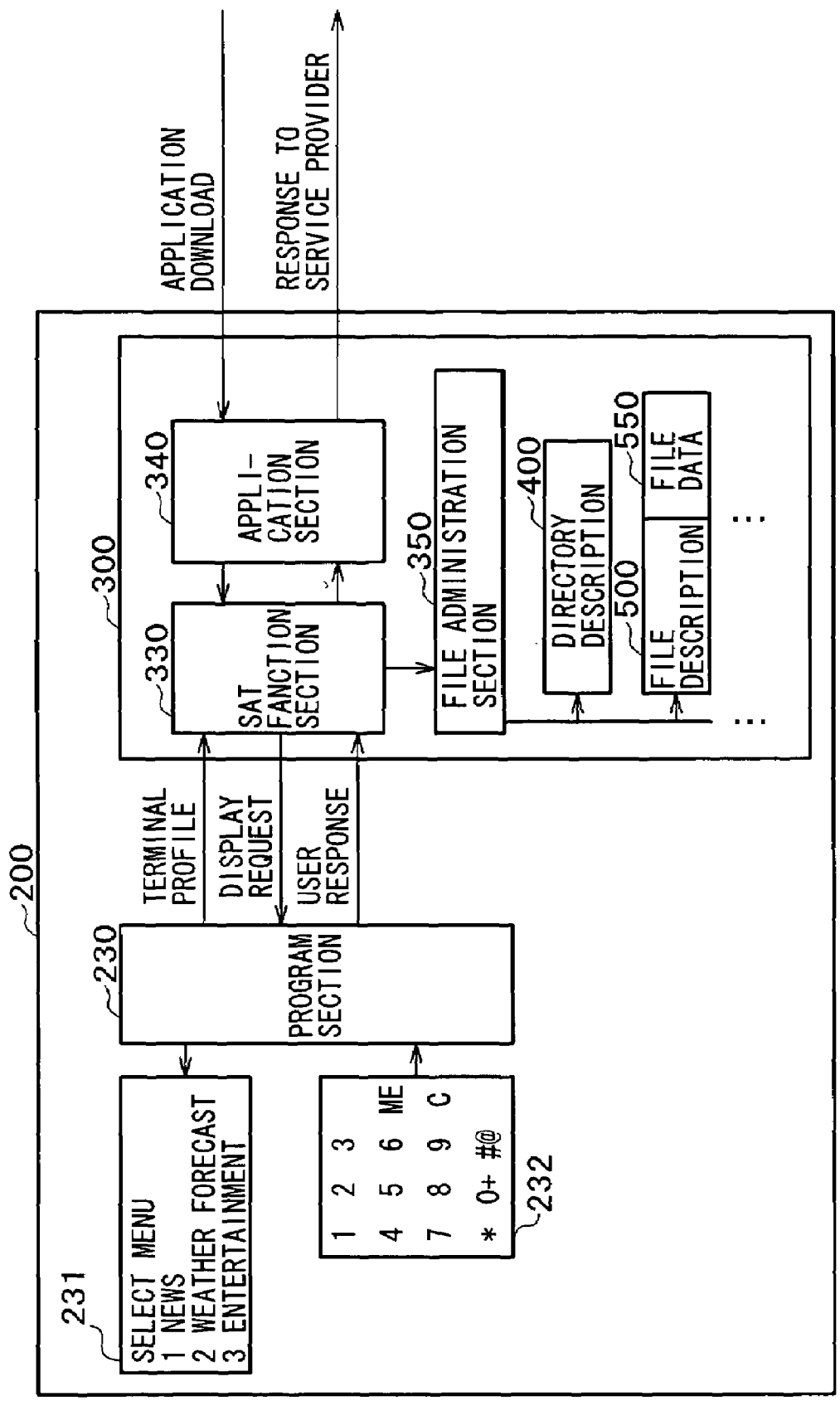
FIG. 11 is a block diagram illustrating an internal logical structure in SIM and a transaction to be executed peripheral to SIM in the above-mentioned embodiment.

The following describes a logical structure in a SIM 300 and transactions with the periphery of the SIM 300 in the present embodiment, with reference to FIG. 11. The SIM 300 has a SAT function section 330, an application section 340, a file administration section 350, a directory description 400, file description 500, and file data 550, as main logical components. The SAT function section 330, the application section 340, and file administration section 350 are mainly realized by the CPU 312 and programs stored in the ROM 311 shown in FIG. 3. The application section 340 uses the RAM 309 as a buffer memory. The directory description 400, file description 500, and the file data 550 are stored in the EEPROM 310 in a nonvolatile manner.

The following describes original SAT operations before describing the embodiment of the invention. The mobile phone 200 is normally recognized as its main body and the SIM 300. If the SIM 300 is found to be compatible with SAT, a program section 230 of this terminal sends a terminal profile that is information indicating what the terminal can do to the SAT function section 330 in the SIM 300. On the other hand, an application program (or simply an application) downloaded from the service provider (109 shown in the figure) for example is stored in the application section 340 that is a dedicated buffer in the SIM 300. The stored application is executed to issue a display request through the SAT function section 330, displaying a user selection menu onto the display section 231 of the terminal, for example. The user makes a response by doing menu selection and entering a selection number for example by using the keyboard 232. The program section 230 sends the selected information to the SAT function section 330, from which the selection information is fed back via the application section 340 to the service provider that provided this application, thereby realizing the interactive information exchange between user and service provider.

In the present embodiment, an extended function according to the invention of the SAT function section 330 may be arranged in which the directory description 400, the file description 500, and file data 550 are directly accessed along a minimum route necessary for achieving a purpose without going through the program section 230 in the main body of the terminal by operating the file administration section 350 in the SIM 300, thereby preventing the malicious third party from reading personal information. In this example, one item of directory description, one item of file description, and one item of file data are used for the brevity of description, but these information and data may also be two or more each. In the present embodiment, the program section 230 of the main body is not used in principle; however, the program section 230 may be used for purpose of displaying message "this is a stolen SIM and disabled for use upon request by the subscriber" for example onto the display section 231 of the terminal by use of the standard SAT function.

The following describes normal password processing associated with security with reference to the PIN access flowchart illustrated in FIG. 6. The handling of PIN1, PIN2, PUK1, and PUK2 described with the directory description shown in FIG. 4 are executed in generally the same manner, a difference lying only in predetermined false counter values, so that PIN1, PIN2, PUK1, and PUK2 will be described collectively.

This processing starts when PIN input is made. First, "PIN Mode Set" for setting one of PIN1, PIN1, PUK1, and PUK2 is executed (S601). Next, in accordance with this setting, "PIN Initialized" decision is made whether or not the PIN concerned has been initialized (S602). If the PIN is found not initialized, "Not Initialized Status" is outputted to the external device (S609). If the PIN has been initialized, "False Counter=0" is determined for the PIN false counter so as to check if the PIN is blocked (S603). If the PIN false counter concerned is 0, "Blocked Status" is outputted to the external device (S613). If the PIN false counter concerned is not 0, it indicates that the PIN concerned is not block, so that "PIN Enabled" decision is made whether or not the PIN verification function is required or not (S604). If the PIN verification function is set to disabled status, "PIN Disabled Status" is outputted to the external device (S610). If the PIN verification function is required, comparison "Compare PIN" is made between the PIN concerned and the entered PIN (S605). Then, "Stored PIN" decision is made to see if there is a match with the stored PIN (S606). If the entered PIN is found to be wrong, then "DECREMENT False Counter" processing is executed to update the false counter (S611) and "Wrong PIN Status" is outputted to inform the external device of the entry of the wrong PIN (S612). If a match is found between the stored PIN and the entered PIN by PIN comparison "Compare PIN" (S605), "FALSE Counter Set to N" for setting the false counter to the initial value is executed (S607). Next, "Normal Ending Command Status" for informing the external device of normal end is outputted (S608), upon which PIN verification comes to an end. When PUK verification ends normally, the PUK false counter is initialized and the false counter of the associated PIN is also initialized.

In the present embodiment, the SIM blocked status is effected by effectively setting the PIN authentication function defined in this PIN status and forcibly setting the false counter value to 0 by SAT, which will be detailed later.

The following describes normal SAT processing.

Figure 7:
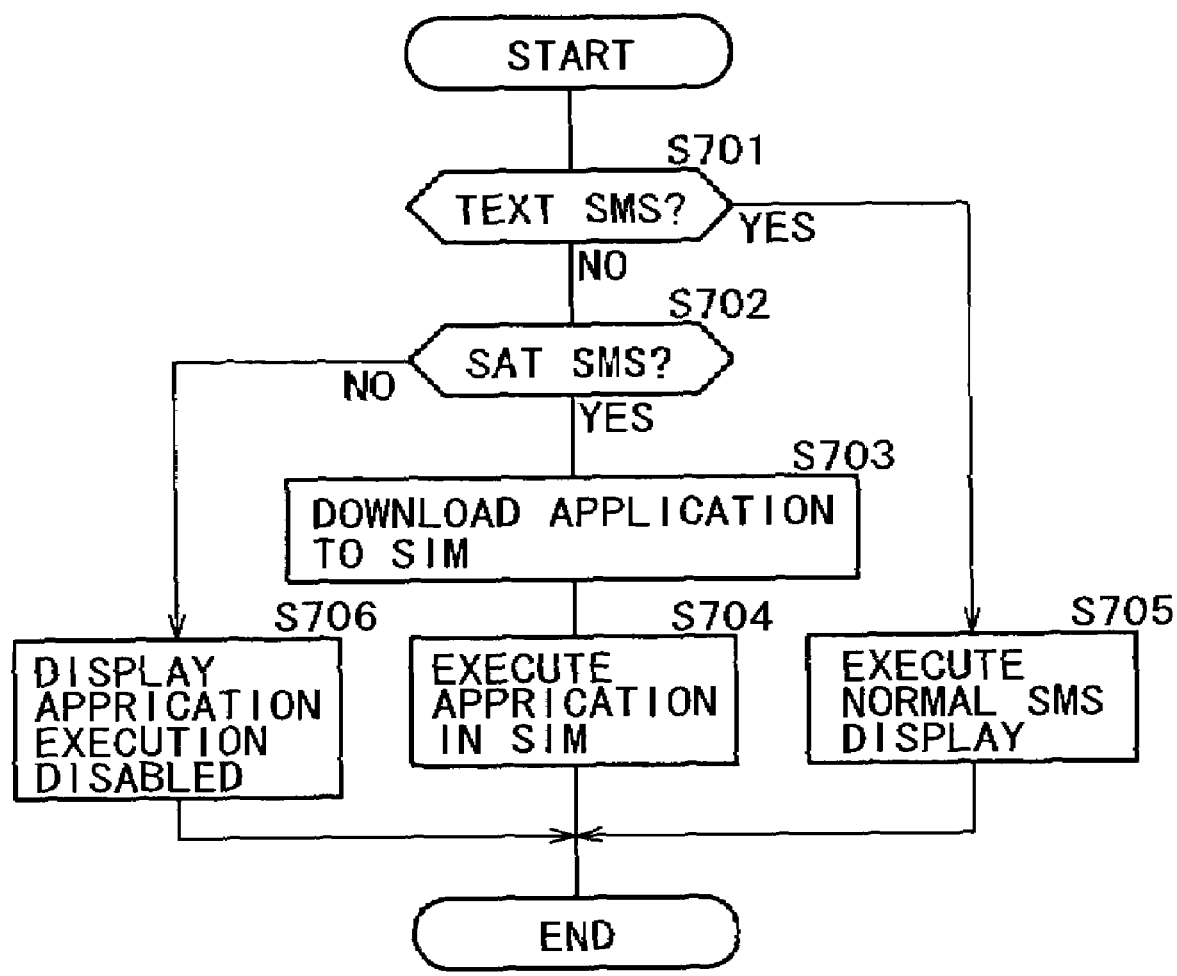
FIG. 7 is a flowchart indicative of SAT processing as normal exemplary processing of a GSM mobile terminal.

FIG. 7 is a SAT processing flow as an example of the normal processing of the GSM mobile terminal. First, a short message based on short message service (SMS) is received to determine whether the received short message is a text (S701). If the short message is found to be a text, then normal SMS display processing is executed (S705), upon which the present processing comes to an end. If the short message is found to be not a text in decision step S701, then it is determined whether the short message is a SAT application (S702). If the short message is found to be not a SAT application, then display indicative of disabled application execution is made (S706), upon which this processing comes to an end. If a SAT application is found received in step S703, then the received SAT application is downloaded to the SIM (S703). When the SAT application has been downloaded into the SIM, then the application is executed in the SIM (S704). If required, predetermined display may be made during this execution to obtain response from the keyboard for example by the user, thereby sending the result of the execution to the side from which the SAT application was supplied. In the present embodiment, the processing for data security is executed by executing this application in the SIM.

Figure 8:
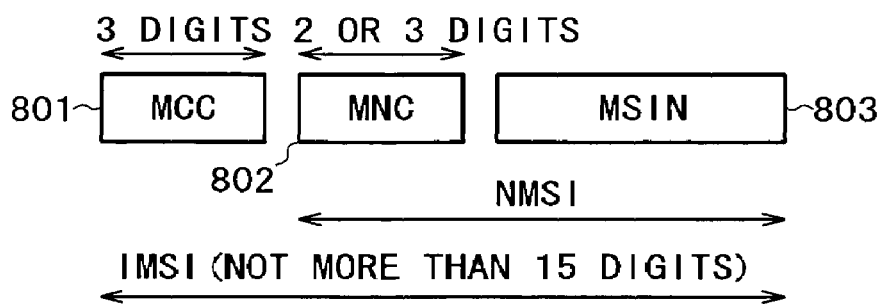
FIG. 8 is a diagram illustrating a structure of IMSI.

The following further describes the above-mentioned processing with respect to IMSI. IMSI is a code for subscriber identification. As shown in FIG. 8, IMSI is composed of several parts. MCC (Mobile Country Code) 801 is a code for country or area identification. MNC (Mobile Network Code) 802 is a code for country or area operator identification. MSIN (Mobile Subscriber Identification Number) 803 is a code for subscriber identification. These three codes linked together are referred to as IMSI (International Mobile station Subscriber Identity). IMSI is registered with the SIM and the authentication center. When the user powers on the mobile terminal, IMSI is sent from the SIM to the authentication center to determine whether the user desiring location is an authorized subscriber. If the user is found to be an authorized subscriber, the procedure goes to the next step for location registration; otherwise, the procedure is discontinued by the base station. Therefore, the subscriber whose mobile terminal has been lost or stolen can make registration with the authentication center to invalidate the IMSI, thereby preventing the third party from using the subscriber's lost or stolen mobile terminal.

IMSI 804 given to the subscriber is associated with the subscriber's telephone number 805, fax number 806, and data communication number 807. The user's mobile phone or SIM has no information corresponding to the telephone number etc. When a call is made to the user concerned, the caller sends the telephone number of the user to the base station. The base station checks the association between the telephone number and IMSI and establishes communication line with the area with which location of IMSI concerned is made, thereby establishing communication with the user concerned. If the mobile phone of the user has been lost or stolen, new IMSI is issued as described before to be registered with the authentication center again. This case is shown by "New IMSI" 808. Telephone number 805, fax number 806, and data communication number 807 can be changed in the association with "New IMSI" 808 without changing these items of information, so that the user can use the original numbers continuously. On the other hand, the old (namely lost or stolen) SIM 804 loses the association with the telephone number and so on, so that the procedure for location registration or the like is rejected by the base station, thereby making the old SIM unusable. However, this configuration cannot fully secure the personal data stored in the SIM. The following procedure according to the present embodiment can further enhance the security of the personal data stored in the SIM.

The following describes an application that is executed in the present embodiment. The following describes all means that can be employed herein. However, it is not necessary for the present invention to execute all of these means. Execution of only a part of these means can also achieve the object of the invention.

Figure 9:
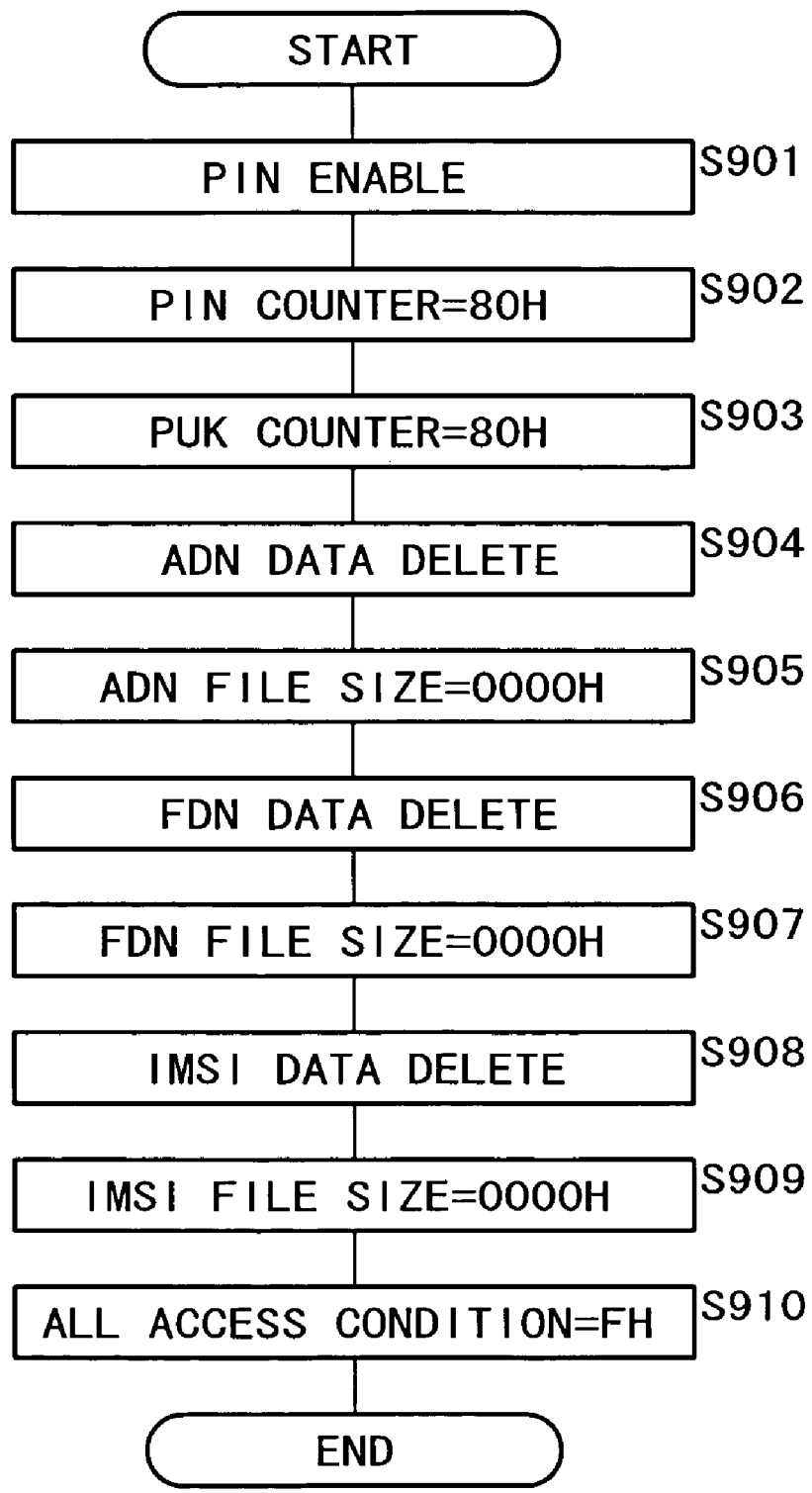
FIG. 9 is a flowchart indicative of data protection processing in SIM in the above-mentioned embodiment.

FIG. 9 is a flowchart indicative of data security processing in the SIM according to the present embodiment. This processing is equivalent to the processing of step S704 of the flowchart shown in FIG. 7. First, "PIN Enable" processing is executed (S901). This processing enables the PIN authentication function by setting the MSB of byte 14 (409) of directory description 400 shown in FIG. 4. Consequently, PIN input is required at least when the power is turned on. In the present embodiment, each PIN is composed of 4- to 8-digit number. The SIM is blocked when a wrong PIN is entered by a predetermined count (3 in this example) consecutively, an attempt of PIN input by the third party knowing no correct PIN fails. "PIN Counter=80Hex" processing in the following step S902 forcibly sets to 0 the false counter value of byte 19 (414) or byte 21 (416) of directory description 400 shown in FIG. 4. This provides the same effect as the false PIN input by the third party three times consecutively as described above (the counter value is decremented every time a wrong PIN is entered, finally reaching 0). Further, if the PIN is blocked, "PUK Counter=80Hex" processing for restoring the blocked PIN is executed (S903). PUK is composed of a 8-digit number. In order to restore the PIN, the SIM must enter PUK. However, if wrong PUKs are entered by a predetermined number of times (10 in this example) consecutively, the SIM is completely blocked. This processing puts the false counter into a blocked status.

Next, "ADN Data Delete" processing is executed to delete the contents themselves of the abbreviated dial file for example stored as personal data, thereby making it totally impossible to read the contents (S904). In addition, "ADN File Size=000Hex" processing is executed (S905) to set the file size to 0 by changing bytes 3 and 4, file size 503, of file description 500. Consequently, if this file is selected, the selected file cannot be read by providing to the outside information that no memory is allocated.

Likewise, "FDN Data Delete" processing is executed to delete the contents themselves of the fixed dial file stored as personal data, thereby making it impossible to read these contents (S906). Further, "FDN File Size=0000Hex" processing is executed to set the size to 0 by the contents of file size 503 of bytes 3 and 4 of file description 500 shown in FIG. 5 (S907). Consequently, providing to the outside the information that, if this file is selected, the memory for it is not allocated, disables to read this file. Also, "IMSI Data Delete" processing is executed to delete IMSI, subscriber-unique information, thereby disabling personal identification (S908). Further, "IMSI File Size=0000Hex" processing is executed to set the size to 0 by modifying the contents of file size 503 of bytes 3 and 4 indicated by the file description shown in FIG. 5 (S909). Consequently, providing to the outside the information that, if this file is selected, the memory for it is not allocated, disables to read this file. In addition, by setting the access condition specified in access condition code 512 indicated by bytes 9 through 11 of file description 500 shown in FIG. 5 to FHex (NEV) in access condition code 512 of file description 500, the access condition is changed so that the file can never be accessed by use of any command system that is operated in the open specifications of the usual GSM (S910).

As described above, changing directory description 400 and/or file description 500 stored in the SIM to prevent the access to the file and the reading the file data itself allows to prevent the personal data from being leaked from the SIM. Thus, the novel configuration provides multi-layered security capabilities.

Figure 10:
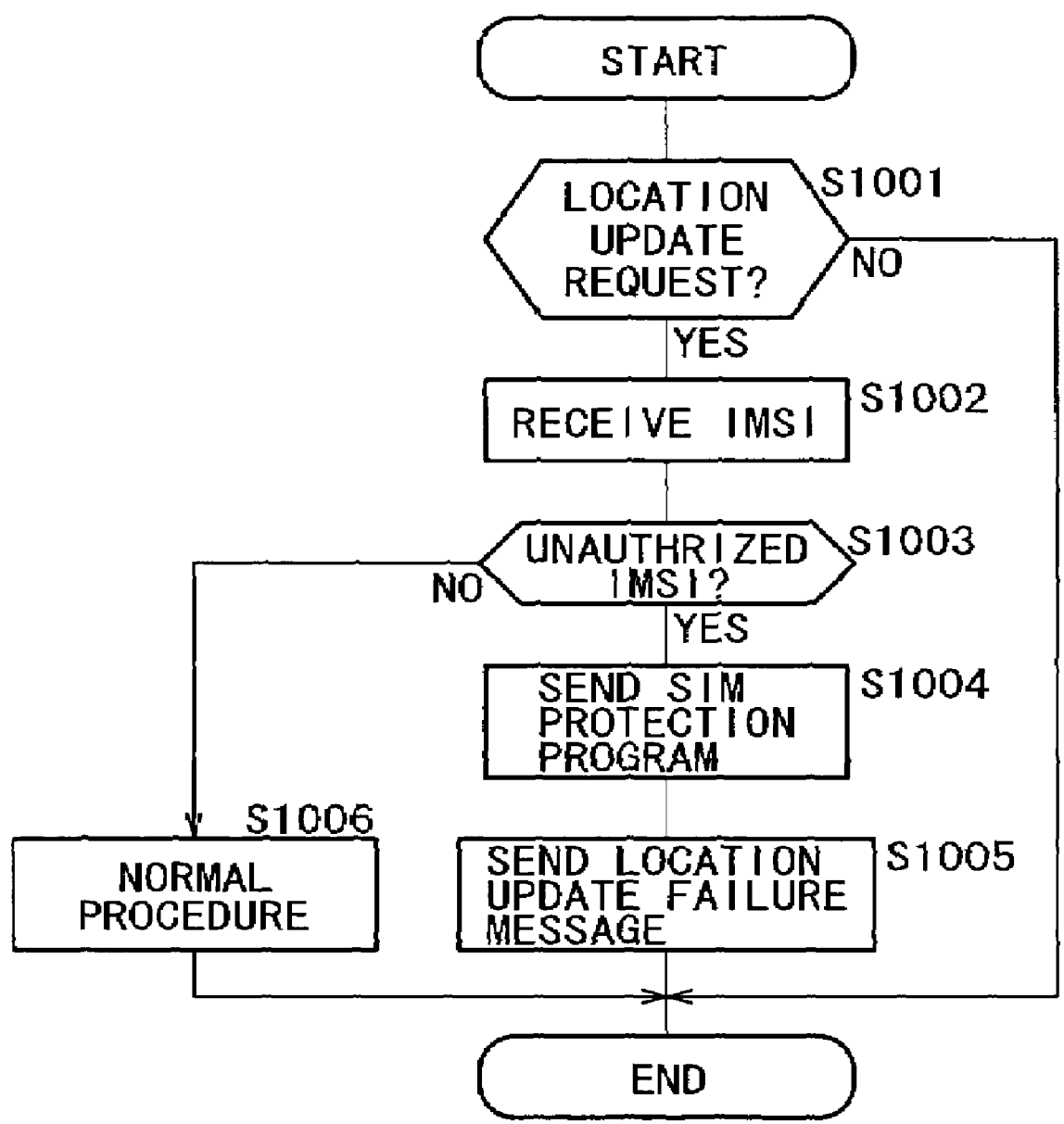
FIG. 10 is a flowchart indicative of processing to be executed on the side of base station in the above-mentioned embodiment.

The following describes the processing to be executed by the base station side to realize the above-mentioned processing to be executed on the terminal side, with reference to the base station processing flow shown in FIG. 10.

When the third party powers on the mobile terminal of which loss of theft has been reported and a location update request is first sent to the base station for location registration, a message supplied from the mobile terminal is determined whether or not it is a location update request (S1001) If the message is found to be not a location update request, then this processing comes to an end. On the other hand, if the message is found to be a location update request, then the base station receives IMSI, which is subscriber identification information, from the mobile terminal (S1002). Next, "unauthorized IMSI" determination is made by the authentication center AuC to see if the subscriber identification information IMSI received from the mobile terminal is authorized or not (S1003).

If the IMSI is found authorized, the normal procedure for the location update request is executed (S1006). On the other hand, if the IMSI is found to be unauthorized, indicative of theft for example, the SIM loaded in the mobile terminal from which the location registration request has been received is unauthorized, upon which s SIM protection program is transmitted from the base station via SAT (S1004). In response, the SIM data protection processing described above with reference to FIG. 9 is executed on the mobile terminal. After transmitting the SIM protection program, the base station transmits a location update failure message to inform the mobile terminal of the rejection of its location update request (S1005), upon which this processing comes to an end.

While a preferred embodiment of the present invention has been described using specific terms, such description is for illustrative purpose only, and it is to be understood that changes and variations may be made without departing from the spirit or scope of the following claims.

For example, in the above-described novel configuration, applications are downloaded from the outside; alternatively, applications may be initially installed in the SIM to be executed in accordance with externally supplied commands.

What is claimed is:

1. A subscriber identity module configured so as to be detachably loaded on a mobile communication terminal for the purpose of subscriber identification, comprising:
application storage means for storing an application program downloaded from the outside;
processing means for executing said application program;
storage means for storing file administrative description, file description, and data; and
file administration means for administering said file administrative description, said file description, and said data;
wherein said processing means includes
means for automatically executing said application program to control said file administration means after downloading of said application program, thereby preventing access to said data if execution authority is verified, and
means for preserving said data and automatically changing at least one of a directory description and a file description stored in the subscriber identity module to prevent access to and reading of said data if execution authority is not verified.

2. The subscriber identity module according to claim 1, wherein said file administrative description includes information indicative whether or not a password function is enabled and information indicative of a password continuous false input count in a password function enabled status and
access to said data is prevented by changing said file administrative description such that said password function is enabled and said password continuous false input count is set to a predetermined maximum count.

3. The subscriber identity module according to claim 1, wherein said file administrative description includes information indicative of a password continuous false input count for restoring a password function disabled status to a password function enabled status and
access to said data is prevented by changing said file administrative description such that said password continuous false input count is set to a predetermined maximum count.

4. The subscriber identity module according to claim 1, wherein access to said data is prevented by deleting data that is under protection.

5. The subscriber identity module according to claim 1, wherein said file description includes a data size and access to said data is prevented by changing said data size that is under protection to 0.

6. The subscriber identity module according to claim 1, wherein access to said data is prevented by deleting subscriber number information stored in said subscriber identity module.

7. The subscriber identity module according to claim 1, wherein said file description includes a file access condition and access to said data is prevented by setting said file access condition for said data under protection to an access disabled status.

8. A subscriber identity module configured so as to be detachably loaded on a mobile communication terminal for the purpose of subscriber identification, comprising:
application storage means for storing an application program for protecting data stored in a subscriber identity module;
processing means for executing said application program;
storage means for storing file administrative description, file description, and data; and
file administration means for administering said file administrative description, said file description, and said data;
wherein said processing means includes
means for and automatically executing said application program in accordance with an externally entered command to control said file administration means, thereby preventing access to said data if execution authority is verified, and means for preserving said data and automatically changing at least one of a directory description and a file description stored in the subscriber identity module to prevent access to and reading of said data if execution authority is not verified.

9. A data access preventing method, comprising the steps of:
comparing subscriber number information received with a location registration request received from a mobile communication terminal device with subscriber number information of a subscriber identity module for data protection at a base station; and
one of automatically
executing a predetermined application program by sending said predetermined application program to said mobile communication terminal device and downloading said application program into said subscriber identity module without considering intention of a user of said mobile communication terminal device if a match is found in the comparison, thereby preventing access to data stored in said subscriber identity module, and
preserving said data and changing at least one of a directory description and a file description stored in the subscriber identity module to prevent access to and reading of said data if no match is found in the comparison.

10. A data access preventing method, comprising the steps of:
comparing subscriber number information received with a location registration request from a mobile communication terminal device with subscriber number information of a subscriber identity module for data protection at a base station; and
one of automatically
executing an application program stored in said subscriber identity module without considering intention of a user of said mobile communication terminal device by sending a command for data protection to said mobile communication terminal device if a match is found in the comparison, thereby preventing access to data stored in said subscriber identity module, and
preserving said data and changing at least one of a directory description and a file description stored in the subscriber identity module to prevent access to and reading of said data if no match is found in the comparison.

11. A subscriber identity module configured so as to be detachably loaded on a mobile communication terminal for the purpose of subscriber identification, comprising:
an application section for storing an application program downloaded from outside;
a processing section for executing said application program;
a storage section for storing file administrative description, file description, and data; and
a file administration section for administering said file administrative description, said file description, and said data;
wherein said processing section is configured to automatically
execute said application program to control said file administration section after said application program has been downloaded, thereby preventing access to said data if execution authority is verified, and
preserving said data and change at least one of a directory description and a file description stored in the subscriber identity module to prevent access to and reading of said data if execution authority is not verified.

12. A subscriber identity module configured so as to be detachably loaded on a mobile communication terminal for the purpose of subscriber identification, comprising:
an application section for storing an application program for protecting data stored in said subscriber identity module;
a processing section for executing said application program;
a storage section for storing file administrative description, file description, and data; and
a file administration section for administering said file administrative description, said file description, and said data;
wherein said processing section is configured to automatically
execute said application program in accordance with an externally entered command to control said file administration section, thereby preventing access to said data if execution authority is verified, and
preserving said data and change at least one of a directory description and a file description stored in the subscriber identity module to prevent access to and reading of said data if execution authority is not verified.

13. A mobile communication terminal device configured so as to detachably accommodate a subscriber identity module for subscriber identification, said subscriber identity module comprising:
an application section for storing an application program downloaded from outside;
a processing section for executing said application program;
a storage section for storing file administrative description, file description, and data; and
a file administration section for administering said file administrative description, said file description, and said data;
wherein said processing section is configured to automatically
execute said application program to control said file administration section after said application program has been downloaded, thereby preventing access to said data if execution authority is verified, and
preserving said data and change at least one of a directory description and a file description stored in the subscriber identity module to prevent access to and reading of said data if execution authority is not verified.

14. A mobile communication terminal device configured so as to detachably accommodating a subscriber identity module for subscriber identification, comprising:
an application section for storing an application program for protecting data stored in said subscriber identity module;
a processing section for executing said application program;
a storage section for storing file administrative description, file description, and data; and
a file administration section for administering said file administrative description, said file description, and said data;
wherein said processing section is configured to automatically execute said application program in accordance with an externally entered command to control said file administration section, thereby preventing access to said data if execution authority is verified, preserving said data and change at least one of a directory description and a file description stored in the subscriber identity module to prevent access to and reading of said data if execution authority is not verified.

* * * * *